United States Patent
Johnson et al.

(10) Patent No.: US 12,169,820 B2
(45) Date of Patent: Dec. 17, 2024

(54) BI-OPTIC OBJECT CLASSIFICATION SYSTEM

(71) Applicant: Toshiba Global Commerce Solutions Holdings Corporation, Tokyo (JP)

(72) Inventors: Brad Matthew Johnson, Raleigh, NC (US); Susan W. Brosnan, Raleigh, NC (US); Andrei Khaitas, McKinney, TX (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 203 days.

(21) Appl. No.: 17/698,954

(22) Filed: Mar. 18, 2022

(65) Prior Publication Data
US 2023/0297990 A1 Sep. 21, 2023

(51) Int. Cl.
*G06Q 20/20* (2012.01)
*G06K 7/10* (2006.01)
*G06K 7/14* (2006.01)
*G06V 10/74* (2022.01)

(52) U.S. Cl.
CPC ....... *G06Q 20/208* (2013.01); *G06K 7/10722* (2013.01); *G06K 7/1413* (2013.01); *G06V 10/74* (2022.01)

(58) Field of Classification Search
CPC ............. G06Q 20/208; G06K 7/10722; G06K 7/1413; G06V 10/74
USPC .......................................................... 705/23
See application file for complete search history.

(56) References Cited

U.S. PATENT DOCUMENTS

| | | | |
|---|---|---|---|
| 5,497,314 A | 3/1996 | Novak | |
| 7,909,248 B1* | 3/2011 | Goncalves | G07G 1/0072 235/462.14 |
| 8,196,822 B2 | 6/2012 | Goncalves | |
| 9,424,480 B2 | 8/2016 | Hastings | |
| 11,134,798 B1* | 10/2021 | Yang | G06N 20/00 |
| 11,334,739 B2* | 5/2022 | Astvatsaturov | G06K 7/1408 |
| 2009/0039164 A1* | 2/2009 | Herwig | G07G 1/14 235/462.41 |
| 2010/0059589 A1* | 3/2010 | Goncalves | G07G 1/0054 382/218 |

(Continued)

OTHER PUBLICATIONS

Unknown. Datalogic announces the simple solution for produce identification at grocery POS: Datalogic announces a color camera accessory for the Magellan 9800i bi-optic scanner for AI (artificial intelligence) based produce identification at grocery POS. PR Newswire; New York. Jan. 13, 2022. (Year: 2022).*

*Primary Examiner* — Florian M Zeender
*Assistant Examiner* — Fawaad Haider
(74) *Attorney, Agent, or Firm* — Patterson + Sheridan, LLP (57) ABSTRACT

The present disclosure provides a system and method for identifying items. The method includes scanning a first item using a first barcode scanner and a second barcode scanner and determining, based on signals from the first barcode scanner and the second barcode scanner, a first two-dimensional light grid indicating where the first item broke beams of the first barcode scanner and the second barcode scanner. The method also includes predicting, using a machine learning model and based on the first two-dimensional light grid, a first category for the first item, receiving, from a camera, an image of the first item, and comparing the image of the first item to a first set of images assigned to the first category to determine an identity of the first item.

8 Claims, 7 Drawing Sheets

(56) References Cited

U.S. PATENT DOCUMENTS

| | | | |
|---|---|---|---|
| 2013/0193210 A1* | 8/2013 | Iizaka | G06K 7/0004 |
| | | | 235/454 |
| 2017/0251183 A1* | 8/2017 | Crooks | G06V 20/52 |
| 2018/0096332 A1* | 4/2018 | O'Herlihy | G08B 21/182 |
| 2018/0204054 A1* | 7/2018 | Takeno | G06V 40/23 |
| 2020/0202091 A1* | 6/2020 | Wilfred | G06K 7/1096 |
| 2020/0364501 A1* | 11/2020 | Herz | G06V 10/82 |
| 2021/0019722 A1* | 1/2021 | Sawada | G06Q 20/203 |
| 2021/0216785 A1* | 7/2021 | Debucean | G06F 18/2415 |
| 2021/0248579 A1* | 8/2021 | Moritz | G06Q 20/208 |
| 2021/0272318 A1* | 9/2021 | Conticello | G06N 3/045 |
| 2021/0401192 A1* | 12/2021 | Yang | G06V 10/764 |
| 2023/0370452 A1* | 11/2023 | Mannengal | H04L 63/20 |

\* cited by examiner

BI-OPTIC OBJECT CLASSIFICATION SYSTEM

BACKGROUND

Certain stores or businesses use self-checkout stations, where shoppers may scan and bag their items. Self-checkout stations, however, provide opportunities for shopper error. For example, shoppers may intentionally or unintentionally misidentify purchased items (e.g., to pay a lower price). As another example, shoppers may fail to scan certain items before bagging the items.

DETAILED DESCRIPTION

To prevent shoppers from intentionally or unintentionally misidentifying a purchased item (e.g., to pay a lower price), the checkout station may be equipped with a camera that captures an image of the purchased item. This image may then be compared with a database of item images to identify the purchased item and to verify the accuracy of the charged price. This process of comparing the captured image with the database of item images to identify the item may be slow and increase the duration of the checkout process.

The present disclosure describes a computing system (e.g., a self-checkout station or self-checkout system) that augments the item identification process using a bi-optic scanner, such as barcode scanners. For example, in addition to scanning barcodes, the barcode scanners at a self-checkout station may be used to scan the outer surface of an item. The signals from the barcode scanners indicate where the item broke the beams emitted by the scanners. The system generates, based on the signals from the scanners, a two-dimensional light grid that provides a silhouette or outline of the item. The system then applies a machine learning technique to analyze the two-dimensional light grid and to predict a category for the item (e.g., produce, boxed item, canned item, etc.). After categorizing the item, the system compares an image of the item (e.g., captured by a camera at the self-checkout station) with a set of images assigned to the category to identify the item. For example, if the system predicts that the item is produce, the system may compare the image of the item with images of produce and not images of boxed or canned items. In this manner, the system reduces the number of images that are compared against the image of the item when identifying the item, which reduces the amount of time it takes to identify the item, in certain embodiments.

Advantages of the Computing System

The computing system improves the speed at which items are identified during a checkout process. Specifically, the computing system uses signals from a bi-optic scanner (e.g., the barcode scanners at the self-checkout station) to generate a light grid and to categorize the item. The system then uses the categorization to reduce the number of images against which an image of the item is compared to identify the item. By reducing the number of images and the number of comparisons, the system reduces the amount of time it takes to identify the item, which speeds up the checkout process, in some embodiments.

Additionally, in some embodiments, the computing system uses the light grid to determine that an item is actually a hand (e.g., a hand of the shopper). The computing system also detects motions of the hand to determine whether the shopper is inappropriately taking an item (e.g., before the item has been charged). If the system determines that the shopper has inappropriately taken an item, the system generates a message indicating that the item was taken. For example, the system may present the message to the shopper on a display of the checkout station, which also effectively locks out the checkout station until the item is returned. As another example, the system may present the message to an administrator who can approach the shopper about the item.

Figure 1:
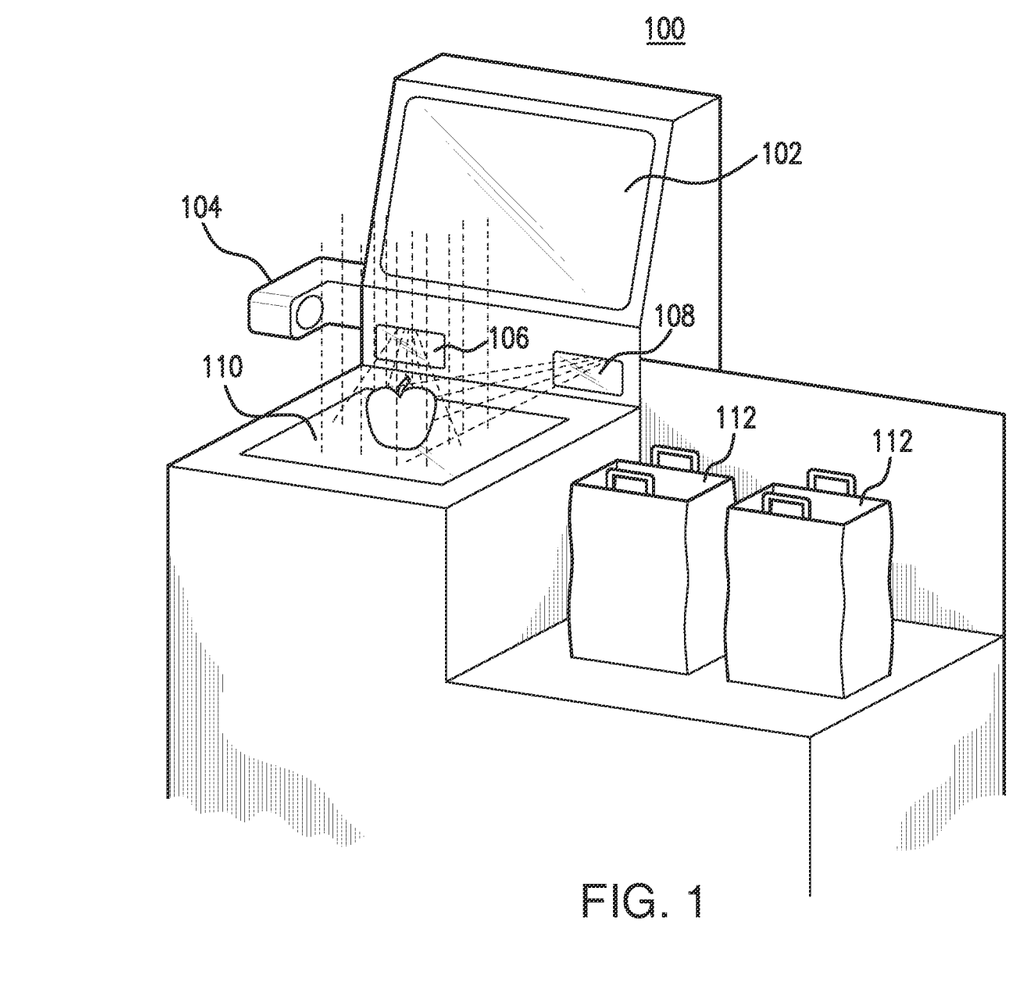
FIG. 1 illustrates an example system.

FIG. 1 illustrates an example system 100. The system 100 may be a checkout station in a store (e.g., a self-checkout station in a grocery store). As seen in FIG. 1, the system 100 includes a display 102, a camera 104, scanners 106, 108 and 110, and containers 112. Generally, the system 100 uses the camera 104 and the scanners 106, 108, and 110 to identify an item that a shopper wants to purchase. The scanners 106, 108, and 110 are first used to scan the item, and information from the scan is used to categorize the item. The camera 104 may then be used to capture an image of the item, and the image is used to identify the item from the identified category. In this manner, the system 100 reduces the time that it takes to identify items relative to conventional systems that use only images from a camera to identify items, in particular embodiments.

The display 102 presents information to a shopper. For example, the display 102 may include a screen that shows an item being purchased by the shopper. Additionally, the screen may show a price for the item and a running total of the shopper's purchase. The shopper may view the display 102 to review information about the shopper's purchase.

The camera 104 may be attached to any suitable component in the system 100. In the example of FIG. 1, the camera 104 is attached to the display 102. The camera 104 may be directed at an area in the system 100 where the shopper is likely to position an item that the shopper desires to purchase. For example, the camera 104 may be directed at an area near the scanners 106, 108, and 110. The camera 104 captures images of items in that area. As a result, the camera 104 may capture images of items that the shopper desires to purchase, as well as images of the shopper's hand.

Conventional systems may attempt to identify an item that a shopper wishes to purchase using only the images captured by the camera 104. For example, these systems may compare the captured images with a large database of images of items available for sale in a store. The systems may then identify an image from the database that is the closest match to the image captured by the camera 104 to identify the item that the shopper is purchasing. Due to the number of images in the database, this process of comparing the image captured by the camera 104 to the images in the database may take a long time, which slows down the checkout process.

The scanners 106, 108, and 110 may be any suitable scanners for scanning items that a shopper wishes to purchase. For example, the scanners 106, 108, and 110 may be barcode scanners that project light beams outwards from the scanners 106, 108, and 110. When the light beams hit an item, the item reflects some of the light back towards the emitting scanners 106, 108, and 110. The scanners 106, 108, and 110 then detect the reflected light and communicate signals indicating characteristics of the reflected light for processing. As seen in FIG. 1, the scanners 106 and 108 are positioned on a vertical surface in the system 100 and directed to project light horizontally outwards from the scanners 106 and 108 towards an item. The scanner 110 is positioned on a horizontal surface in the system 100 and directed to project light vertically from the scanner 110 towards the item. As a result, the scanners 106 and 108 emit light in a direction that is orthogonal to the direction in which the scanner 110 emits light. In some embodiments, the scanners 106, 108, and 110 are directed at different angles so that the scanners 106, 108, and 110 emit light signals in different planes.

When the scanners 106, 108, and 110 are used to scan barcodes, the reflected light beams may be processed to determine the shapes or thicknesses of the bars in the barcode. The scanners 106, 108, and 110, however, may also be used to scan the surfaces of items to determine the shapes and sizes of the items. For example, the signals from the scanners 106, 108, and 110 may indicate where an item broke the light beams emitted by the scanners 106, 108, and 110. The signals from the scanners 106, 108, and 110 may include coordinates, intensity values, or luminosity values that indicate where an item physically broke the light beams emitted by the scanners 106, 108, and 110. For example, the closer that an item is to a scanner when the item broke the light beam emitted by the scanner, the more intense or luminous the reflected light beam detected by the scanner will be. Thus, the signals from the scanners 106, 108, and 110 may be analyzed to determine a size and shape of the item so that the item can be categorized. For example, the various intensity or luminosity values of the reflected beams may be analyzed to determine where and how the surface of the item broke the light beams emitted from the scanners 106, 108, and 110. This information reveals the size and shape of the item, which are used to categorize the item.

The item category may then be used to reduce the number of images to be compared with the image captured by the camera 104 to identify the item. For example, if the system 100 determines that an item is in the category "Produce," then the system 100 may compare an image of the item captured by the camera 104 with only images of produce stored in the database. The system 100 need not compare the image with images of boxed products or canned goods stored in the database. As a result, the system 100 reduces the set of images from the database that are compared to the image captured by the camera 104 to identify the item, and it takes less time to identify the item, in certain embodiments.

After scanning or purchasing an item, the shopper places the item in one or more containers 112. The system 100 may include any suitable containers 112 (e.g., bags, boxes, crates, baskets, etc.) The containers 112 may be located proximate the other components in the system 100 so that the shopper may easily place items into the containers 112 after scanning those items.

Figure 2:
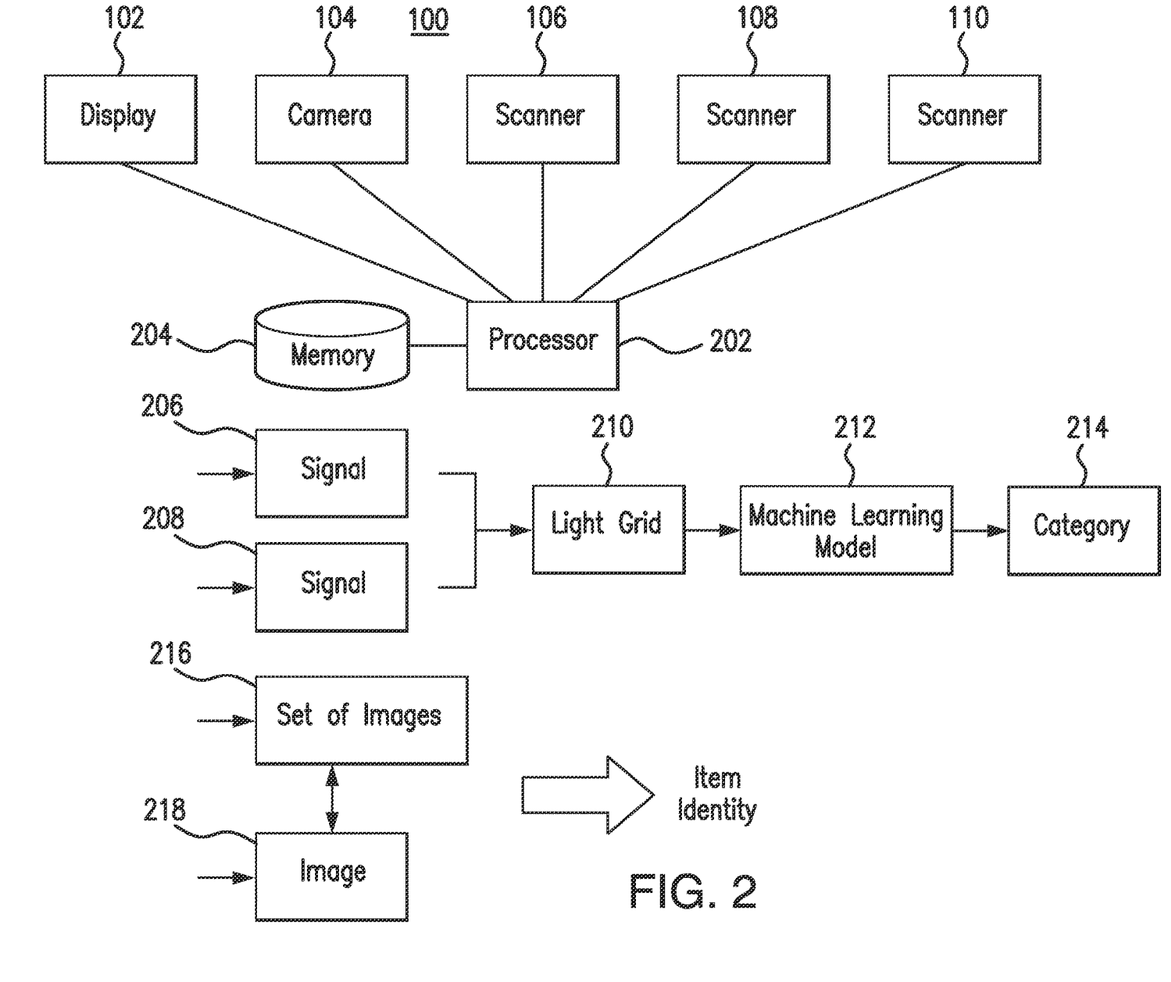
FIG. 2 illustrates the example system of FIG. 1.

FIG. 2 is a block diagram of the system 100 of FIG. 1. As seen in FIG. 2, the system 100 includes the display 102, the camera 104, and the scanners 106, 108, and 110. Additionally, the system 100 includes a processor 202 and a memory 204. The camera 104, the scanners 106, 108, and 110, and the memory 204 communicate information to the processor 202 so that the processor 202 may perform the actions and functions of the system 100 described herein.

The processor 202 is any electronic circuitry, including, but not limited to one or a combination of microprocessors, microcontrollers, application specific integrated circuits (ASIC), application specific instruction set processor (ASIP), and/or state machines, that communicatively couples to memory 204 and controls the operation of the system 100. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the system 100 by processing information (e.g., information received from the camera 104, scanners 106, 108, and 110, and memory 204). The processor 202 is not limited to a single processing device and may encompass multiple processing devices.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein.

The processor 202 receives one or more signals 206 and 208 from the scanners 106, 108, and 110. As discussed previously, the signals 206 and 208 include information that indicates where or how an item physically broke light beams emitted by one or more of the scanners 106, 108, and 110. For example, the signals 206 and 208 may include coordinates indicating where the item physically broke the beams emitted by one or more of the scanners 106, 108 and 110. As another example, the signals 206 and 208 may include values indicating the intensity or luminosity of reflected light detected by one or more of the scanners 106, 108, and 110. These intensity and luminosity values may indicate where the item physically broke the light beams emitted by one or more of the scanners 106, 108 and 110. For example, the higher the intensity or luminosity value of a reflected light signal, the closer the item was to the emission point when the item broke the emitted light beam.

The processor 202 processes the information in the signals 206 and 208 to generate or determine a light grid 210. The light grid 210 may be a two-dimensional grid that includes a silhouette or an outline of the item determined using the information in the signals 206 and 208. For example, the light grid 210 may reveal the size, shape, or contours of the item. Because the scanners 106, 108, and 110 emit light in different directions, the signals 206 and 208 may reveal information about an item in different dimensions. This information may be combined or amalgamated to determine the external contours of the item shown in the light grid 210. As an example, the processor may convert the values indicating the intensity or luminosity of reflected light beams detected by the scanners 106, 108, and 110 into positions in the grid. For a particular intensity or luminosity value, the position of the emitted light beam may represent a first coordinate for a point in the grid and the intensity or luminosity value may indicate a second coordinate for the point in the grid. By mapping the points for the multiple intensity or luminosity values for any scanner, the processor 202 creates the light grid 210 that shows the shape, size, or contours of an external surface of the item.

The light grid 210 is used as an input into a machine learning model 212. The machine learning 212 may examine the information in the light grid 210 to predict a category 214 for the item. In some embodiments, the machine learning model 212 is a classification model that underwent supervised training so that the machine learning model 212 may recognize the category 214 for an item based on the external surfaces of the item shown in the light grid 210.

For example, the machine learning model 212 may examine the light grid 210 and determine that an item is spherical or circular. In response, the machine learning model 212 may determine that the category 214 for the item is produce. As another example, the machine learning model 212 may examine the information in the light grid 210 and determine that the item is rectangular in shape. In response, the machine learning model 212 may determine that the category 214 for the item is a boxed item. As another example, the machine learning model 212 may examine the information in the light grid 210 and determine that the item is cylindrical in shape. In response, the machine learning model 212 may determine that the category 214 for the item is a canned item.

Although the present disclosure describes several example categories 214, the categories 214 are not limited to these examples. The system 100 may determine that an item is in any suitable category. For example, the system 100 may determine that an item is produce, a boxed item, a canned item, a bottled item, etc. Additionally, the system 100 may implement a default or "catch all" category to which an item is assigned if the item is not assigned to any other category or if the system 100 is unable to assign the item to any of the other categories.

In some embodiments, the system 100 implements multiple layers of categorization. For example, the system 100 may further assign an item to a sub-category after assigning the item to a category 214. These sub-categories may be assigned based on any suitable attribute or characteristic. For example, sub-categories may be assigned based on a size of the item, a color of the item, a shape of the item, text that appears on the item, etc.

The machine learning model 212 may implement any suitable machine learning technique to categorize the item based on information in the light grid 210. For example, blob detection, object recognition, or random sample consensus may be used to categorize the item. Additionally, computer vision techniques (e.g., feature descriptors, feature detection, Harris affine region detection, scale-invariant feature transformation, and structure from motion) may be used. In some embodiments, the machine learning model 212 uses a combination of these techniques to improve the accuracy of the categorization.

After categorizing the item, the processor 212 determines a set of images 216 that are assigned to the determined category 214. For example, if the machine learning model 212 determines that an item is produce, then the processor 202 may retrieve a set of images 216 for produce. As another example, if the machine learning model 212 determines that an item is a boxed item, then the processor 212 may retrieve a set of images 216 for boxed items. In some embodiments, the processor 202 may retrieve the set of images 216 from a large database of images of items available for purchase. The images may be stored in the database according to their respective categories. The processor 202 may retrieve sets of images 216 according to the determined category 214.

After retrieving the set of images 216, the processor 202 compares an image 218 captured by the camera 104 of the item with the set of images 216. By comparing the image 218 to the set of images 216, the processor 202 determines an identity for the item. Because the processor 202 compares the image 218 with only the set of images 216, the image 218 is not compared to the full set of images in the database. As a result, the comparison process takes less time, which improves the speed of the identification process and the checkout process, in certain embodiments.

In embodiments where the item is assigned to a sub-category, the processor 202 may retrieve only the images 216 assigned to that sub-category instead of retrieving every image assigned to the broader category 214. Thus, by assigning the item to a sub-category, the number of images that are retrieved and compared may be further reduced.

By identifying the item in this manner, the processor 202 may verify that a shopper is actually purchasing an item indicated by the shopper. For example, if the shopper indicates to the system 100 that the shopper is purchasing an orange (e.g., by entering a produce code), the processor 202 may determine the identity of the item and verify that the shopper is indeed purchasing an orange. In this manner, the processor 202 improves loss prevention, in certain embodiments.

Figure 3:
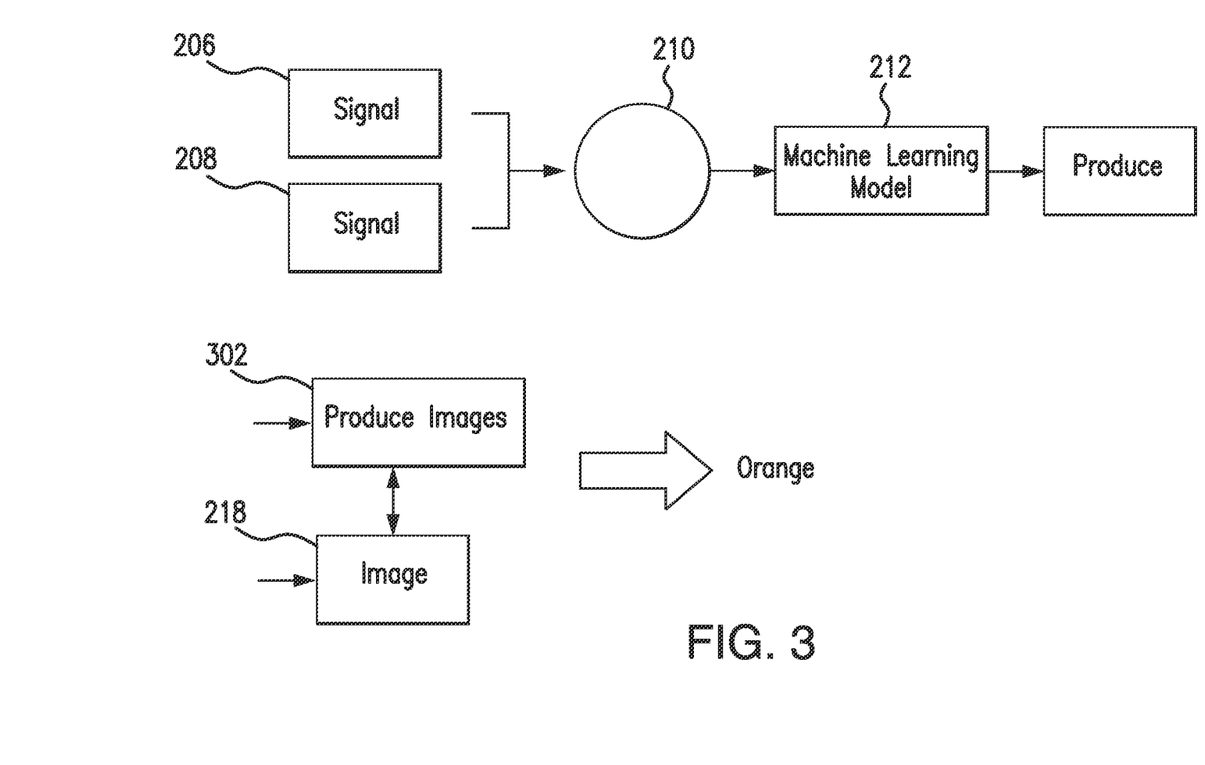
FIG. 3 illustrates an example item identification in the system of FIG. 1.

FIG. 3 illustrates an example item identification in the system 100 of FIG. 1. As seen in FIG. 3, the system 100 receives the signals 206 and 208, indicating where an item physically broke the beams emitted by one or more of the scanners 106, 108, and 110. Based on the information in the signals 206 and 208, the system 100 determines a light grid 210 showing that the item is spherical or circular. The system 100 applies the machine learning model 212 to the light grid 210 to predict that the item category is produce. For example, the machine learning model 212 may predict, based on the size and shape of the item shown in light grid 210, that the item category is produce.

In response, the system 100 retrieves produce images 302. For example, the system 100 may retrieve the produce images 302 from a large database of images. The system 100 then compares the image 218 captured by the camera 104 with the produce images 302 to identify the item. In the example of FIG. 3, the system 100 determines, based on the comparison, that the item is an orange. The system 100 may then verify that the shopper was charged for an orange.

Figure 4:
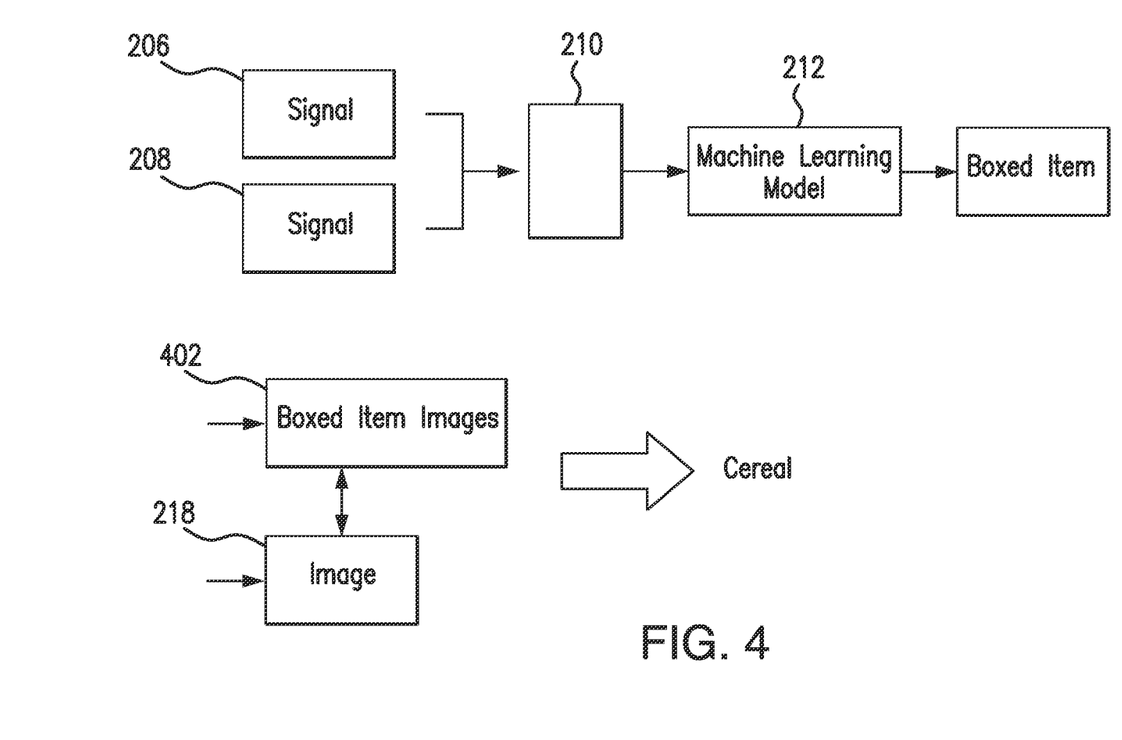
FIG. 4 illustrates an example item identification in the system of FIG. 1.

FIG. 4 illustrates an example item identification in the system 100 of FIG. 1. As seen in FIG. 4, the system 100 receives the signals 206 and 208. As discussed previously, the signals 206 and 208 may include information that indicates where an item physically broke light beams emitted by one or more of the scanners 106, 108, and 110. Based on the information in the signals 206 and 208, the system 100 generates the light grid 210 that shows the external contours of the item. In the example of FIG. 4, the light grid 210 shows that the item is rectangular in shape. The system 100 applies the machine learning model 212 to the information in the light grid 210 to predict an item category. The machine learning model 212 may analyze the size and shape of the item shown in the light grid 210 and predict that the item is a boxed item.

The system 100 then retrieves boxed item images 402. For example, the system 100 may retrieve the boxed item images 402 from a large database of items. The system 100 then compares the image 218 captured by the camera 104 with the boxed item images 402 to identify the item. In the example of FIG. 4, the system 100 identifies the item as cereal. The system 100 may then verify that the user was charged for cereal.

Figure 5:
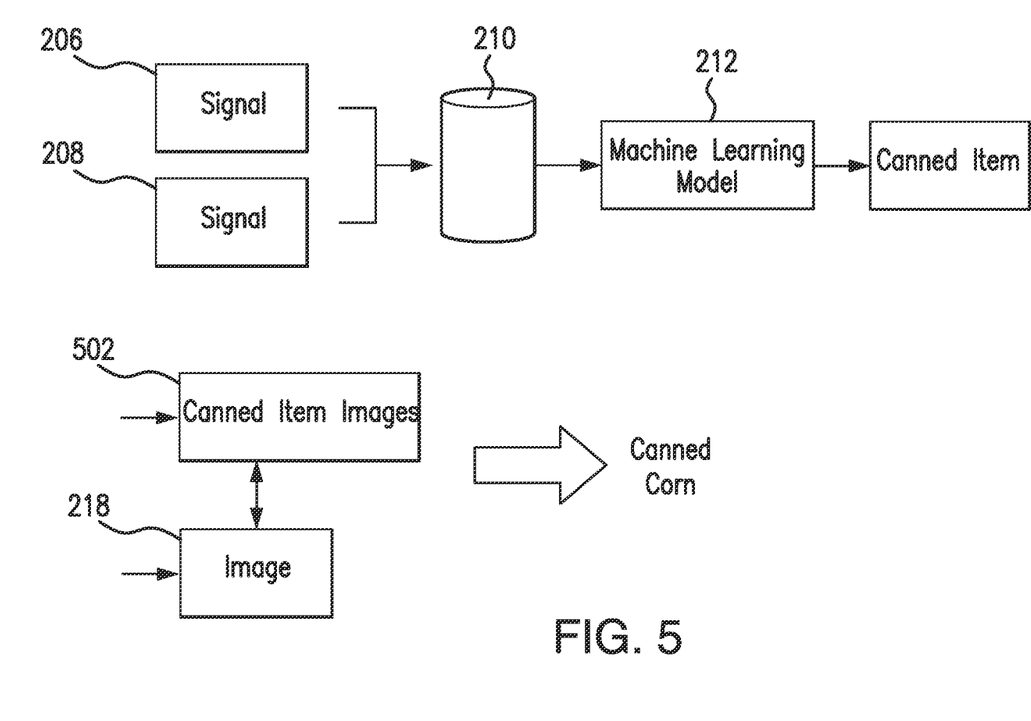
FIG. 5 illustrates an example item identification in the system of FIG. 1.

FIG. 5 illustrates an example item identification in the system 100 of FIG. 1. As seen in FIG. 5, the system 100 receives the signals 206 and 208. As discussed previously, the signals 206 and 208 include information that indicates where an item physically broke light beams emitted by one or more of the scanners 106, 108, and 110. The system 100 generates the light grid 210 based on the information in the signals 206 and 208. In the example of FIG. 5, the system 100 generates the light grid 210 showing that the item is cylindrical. The system 100 then applies the machine learning model 212 to the information in the light grid 210 to categorize the item. The machine learning model 212 examines the size and shape of the item shown in the light grid 210 to predict that the item is a canned item.

The system 100 then retrieves, from a large database of items, canned item images 502. The system 100 compares the image 218 captured by the camera 104 with the canned item images 502 to identify the item. In the example of FIG. 5, the system 100 identifies the item as canned corn based on this comparison. The system 100 then verifies that the shopper was charged for canned corn.

Figure 6:
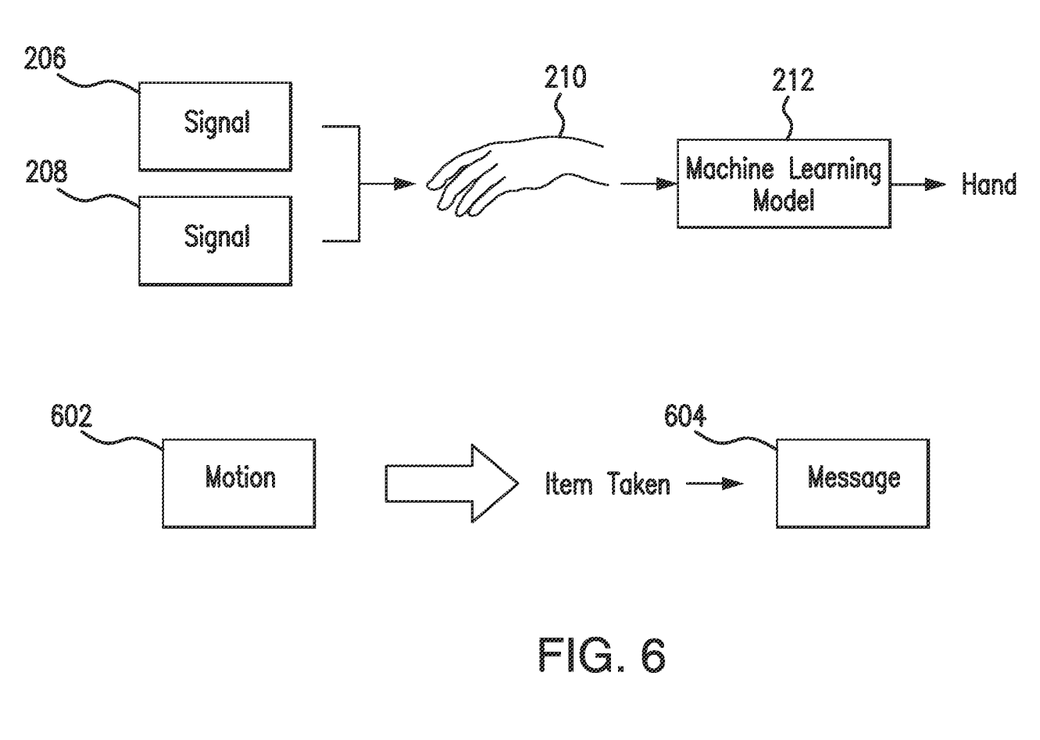
FIG. 6 illustrates an example item identification in the system of FIG. 1.

FIG. 6 illustrates an example item identification in the system 100 of FIG. 1. As seen in FIG. 6, the system 100 receives the signals 206 and 208. As discussed previously, the signals 206 and 208 include information that indicates, where an item physically broke light beams emitted from one or more of the scanners 106, 108, and 110. The system 100 uses the information in the signals 206 and 208 to generate the light grid 110 that shows the external contours of the item. In the example of FIG. 6, the system 100 generates the light grid 210 that shows that the item has a shape resembling a hand. The system 100 applies the machine learning model 212 to the information in the light grid 210 to predict a category for the item. The machine learning model 212 analyzes the information in the light grid 210 and predicts that the item is a hand.

The system 100 may determine a motion 602 made by the hand. For example, the system 100 may use the camera 104 and/or the scanners 106, 108, and 110 to detect the motion 602 of the hand. Based on the detected motion 602, the system 100 determines that an item was taken (e.g., before the item was charged). For example, the motion 602 may be the hand grabbing and moving an item away from the camera 104 and the scanners 106, 108, and 110. In response to the motion 602, the system 100 may determine that an item was being taken. The system 100 generates a message 604 indicating that the item was taken. The system 100 may present the message 604 to the shopper to alert the shopper that an item was taken before the item was charged. For example, the system 100 may present the message 604 on the display 102 so that the shopper may see the message. As another example, the system 100 may communicate the message 604 to an administrator terminal, so that an administrator of the system 100 may follow up with the shopper regarding the taken item.

Figure 7:
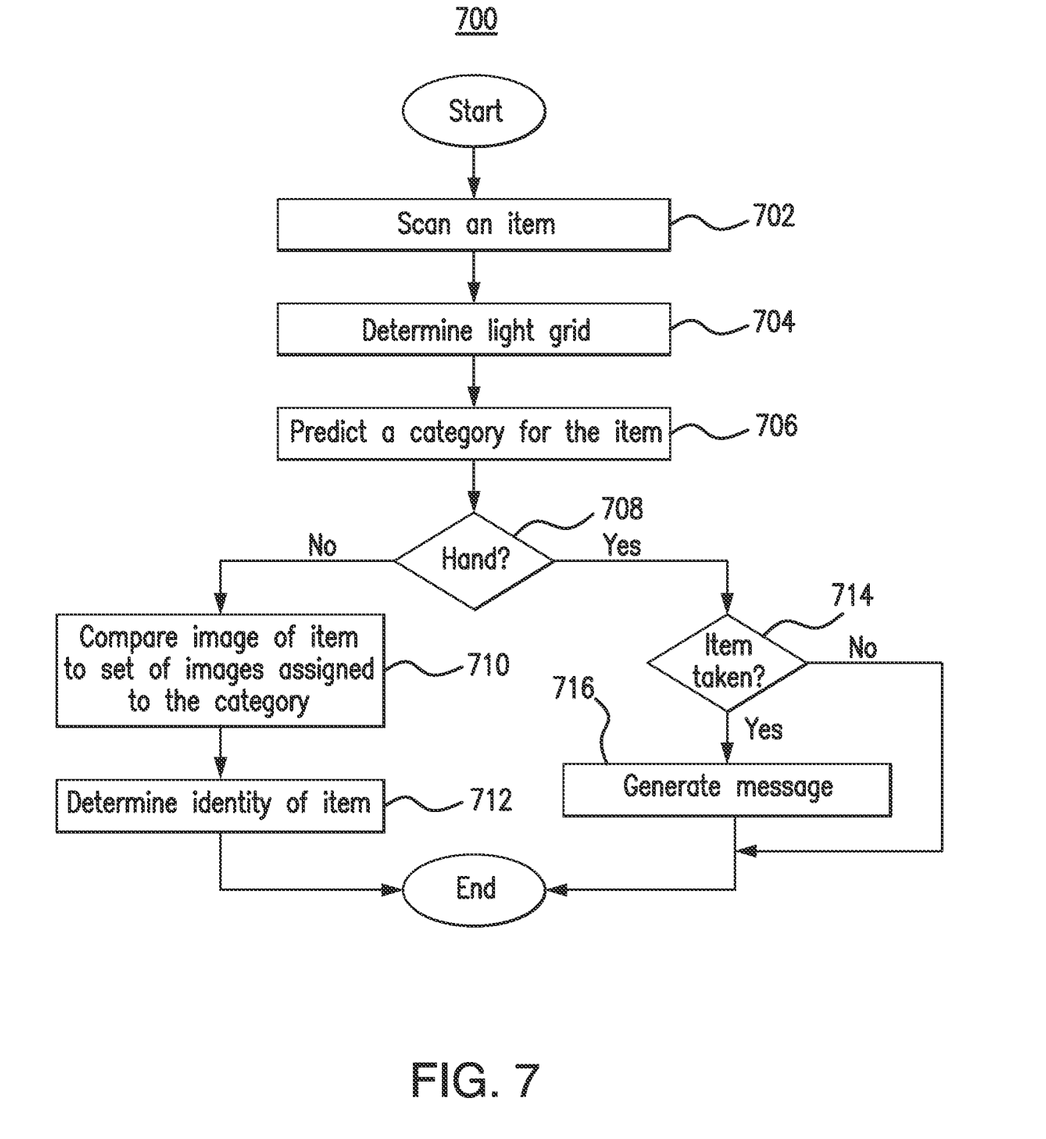
FIG. 7 is a flowchart of an example method performed in the system of FIG. 1.

FIG. 7 is a flowchart of an example method 700 performed in the system 100 of FIG. 1. In particular embodiments, one or more components of the system 100 perform the steps of the method 700. By performing the method 700, the system 100 improves the speed at which item identification is performed, which reduces the time it takes to perform the checkout process.

In block 702, one or more scanners 106, 108, and 110 scan an item. For example, a shopper may have moved the item across an area near the scanners 106, 108, and 110. The scanners 106, 108, and 110 may be barcode scanners that emit light signals towards the item. When the light signals hit the item or when the item breaks the light signals, the item reflects the light signals back towards the scanners 106, 108, and 110. The scanners 106, 108, and 110 then produce signals 206 and 208 that include information indicating where the item broke the beams emitted from the scanners 106, 108, and 110. For example, the signals 206 and 208 may include coordinates indicating where the beams were broken. As another example, the signals 206 and 208 may include values that indicate an intensity or luminosity of a reflected light signal. Higher intensity or luminosity values may indicate that the item was closer to the scanners 106, 108, and 110 when the item broke the beams emitted by the scanners 106, 108 and 110.

In block 704, the processor 202 uses the information in the signals 206 and 208 to determine the light grid 210. The processor 202 determines where the item broke the light beams emitted from the scanners 106, 108, and 110 and combines that information with information indicating the orientation of the scanners 106, 108, and 110 and the location and direction of the light beams to construct the light grid 210 showing the external surfaces or contours of the item. For example, the location and direction of light beams may establish a first coordinate of a point in the light grid, and the intensity or luminosity values may establish a second coordinate of the point in the light grid. Mapping multiple points for the multiple light beams emitted by the scanners 106, 108, and 110 produces the light grid 210. As a result, the information in the light grid 210 resembles a silhouette of the item and may reveal the size and shape of the item.

In block 706, the processor 202 predicts a category 214 for the item using the information in the light grid 210. The processor 202 may apply a machine learning model 212 to the information in the light grid 210 to predict the item category 214. The machine learning model 212 may analyze the information in the light grid 210 (e.g., the size and shape of the item) to classify the item within a particular category 214. The machine learning model 212 may implement any suitable machine learning technique to categorize the item based on information in the light grid 210. For example, blob detection, object recognition, or random sample consensus may be used to categorize the item. Additionally, computer vision techniques (e.g., feature descriptors, feature detection, Harris affine region detection, scale-invariant feature transformation, and structure from motion) may be used. In some embodiments, the machine learning model 212 uses a combination of these techniques to improve the accuracy of the categorization.

In block 708, the processor 202 determines whether the predicted category 214 for the item is a hand (e.g., a hand of the shopper). If the category 214 is not a hand, the processor 202 compares an image 218 of the item to a set of images 216 assigned to the identified category in block 710. The image 218 may have been captured by a camera 104 in the system 100 as the item was scanned by the scanners 106, 108, and 110. The processor 202 may retrieve the set of images 216 from a large database of images of items. For example, the database may store images of all items sold by a store. The images in the database may be organized by item category. The processor 202 retrieves the set of images 216 from the database using the category 214 of the item identified by the machine learning model 212. As a result, the processor 202 retrieves only a subset of the images stored within the database. For example, if the processor 202 determines that an item is a produce item, the processor 202 retrieves the set of images 216 assigned to the produce category and compares the image 218 of the item to the produce images. As another example, if the processor 202 determines that an item is a canned item, the processor 202 retrieves the set of images 216 assigned to the canned category and compares the image 218 of the item to the canned item images.

In block 712, the processor 202 determines an identity of the item based on the comparison of the image 218 with the set of images 216. In certain embodiments, the comparison process and the identification process take less time than in conventional systems, because the processor 202 does not compare the image 218 to every image in the database. Rather, the processor 202 compares the image 218 to only a subset of the images in the database that are assigned to the category 214 of the item. For example, if the processor 202 identifies the item as produce then the processor 202 retrieves only produce images 302 from the database, then the image 218 is compared to the produce images 302 and not to boxed item images 402 or canned item images 502.

If the processor 202 categorizes the item as a hand, then the processor 202 determines whether an item was taken in block 714. In some embodiments, a motion 602 of the hand may be captured by the camera 104 or the scanners 106, 108, and 110. Based on this detected motion 602, the processor 202 may determine whether an item was taken. For example, if the motion 602 shows that the hand made a grabbing motion and then moved away from the camera 104 and the scanners 106, 108, and 110, then the processor 202 determines that an item was taken. In response to that determination, the processor 202 generates a message 604 in block 716. The message 604 indicates that the item was taken. The processor 202 may present the message 604 to the shopper (e.g., on a display 102). As another example, the processor 202 may communicate the message 604 to an administrator so that the administrator may follow up with the shopper about the taken item. In this manner, the processor 202 assists in loss prevention. If the processor 202 determines that no item was taken, then the method 700 may conclude.

In summary, a computing system 100 (e.g., a self-checkout station at a grocery store) augments the item identification process using a bi-optic scanner, such as multiple barcode scanners 106, 108, and 110. For example, in addition to scanning barcodes, the barcode scanners 106, 108, and 110 may be used to scan the outer surface of an item. The signals 206 and 208 from the barcode scanners 106, 108, and 110 indicate where the item broke the beams emitted by the scanners 106, 108, and 110. The system 100 generates, based on the signals 206 and 208 from the scanners 106, 108, and 110, a two-dimensional light grid 210 that provides a silhouette or outline of the item. The system 100 then applies a machine learning technique to analyze the two-dimensional light grid 210 and to predict a category 214 for the item (e.g., produce, boxed item, canned item, etc.). After categorizing the item, the system 100 compares an image 218 of the item (e.g., captured by a camera 104 at the self-checkout station) with a set of images 216 assigned to the category to identify the item. For example, if the system 100 predicts that the item is produce, the system 100 may compare the image 218 of the item with images of produce and not images of boxed or canned items. In this manner, the system 100 reduces the number of images that are compared against the image 218 of the item when identifying the item, which reduces the amount of time it takes to identify the item, in certain embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method comprising:
scanning a first item using a first barcode scanner and a second barcode scanner, wherein the first barcode scanner and the second barcode scanner are arranged such that beams of the first barcode scanner and beams of the second barcode scanner are in different planes;
determining, based on signals from the first barcode scanner and the second barcode scanner, a first two-dimensional light grid indicating where the first item broke the beams of the first barcode scanner while breaking the beams of the second barcode scanner;
predicting, using a machine learning model and based on the first two-dimensional light grid, a first category for the first item, wherein the first two-dimensional light grid indicates to the machine learning model a size and shape of the first item, and wherein the first category of the first item is one of produce or a boxed item;
receiving, from a camera, an image of the first item;
after predicting the first category for the first item, retrieving, from a database, a first set of images of items assigned to the first category;
after retrieving the first set of images assigned to the first category, comparing the image from the camera of the first item to the first set of images assigned to the first category;
selecting an image from the first set of images of items in the first category based on similarities between (i) the image from the first set of images of items assigned to the first category and (ii) the image of the first item, wherein the image from the first set of images of items assigned to the first category shows an item;
determining an identity of the first item as the item in the image from the first set of images;
determining, based on a motion of a hand, that a second item is being taken by the hand; and
generating a message indicating that the second item is being taken.

2. The method of claim 1, further comprising:
scanning a third item using the first barcode scanner and the second barcode scanner;
determining, based on signals from the first barcode scanner and the second barcode scanner, a second two-dimensional light grid indicating where the third item broke the beams of the first barcode scanner and the second barcode scanner; and
predicting, using the machine learning model and based on the second two-dimensional light grid, that the third item is the hand.

3. The method of claim 1, further comprising refraining from comparing the image of the first item to a second set of images assigned to a second category different from the first category.

4. A system comprising:
a first barcode scanner arranged to scan a first item;
a second barcode scanner arranged to scan the first item, wherein the first barcode scanner and the second barcode scanner are arranged such that beams of the first barcode scanner and beams of the second barcode scanner are in different planes;
a camera arranged to capture an image of the first item;
a memory; and
a hardware processor communicatively coupled to the memory, the hardware processor configured to:
  determine, based on signals from the first barcode scanner and the second barcode scanner, a first two-dimensional light grid indicating where the first item broke the beams of the first barcode scanner while breaking the beams of the second barcode scanner;
  predict, using a machine learning model and based on the first two-dimensional light grid, a first category for the first item, wherein the first two-dimensional light grid indicates to the machine learning model a size and shape of the first item, and wherein the first category of the first item is one of produce or a boxed item;
  after predicting the first category for the first item, retrieve, from a database, a first set of images of items assigned to the first category;
  after retrieving the first set of images assigned to the first category, compare the image from the camera of the first item to the first set of images assigned to the first category;
  select an image from first set of images of items assigned to the first category based on similarities between (i) the image from the first set of images of items in the first category and (ii) the image of the first item, wherein the image from the first set of images of items assigned to the first category shows an item;
  determine an identity of the first item as the item in the image from the first set of images;
  determine, based on a motion of a hand, that a second item is being taken by the hand; and
  generate a message indicating that the second item is being taken.

5. The system of claim 4, wherein:
the first barcode scanner and the second barcode scanner are further arranged to scan a third item;
the hardware processor is further configured to:
  determine, based on signals from the first barcode scanner and the second barcode scanner, a second two-dimensional light grid indicating where the third item broke the beams of the first barcode scanner and the second barcode scanner; and
  predict, using the machine learning model and based on the second two-dimensional light grid, that the third item is a hand.

6. The system of claim 4, wherein the hardware processor is further configured to refrain from comparing the image of the first item to a second set of images assigned to a second category different from the first category.

7. A non-transitory computer readable medium storing instructions that, when executed by a hardware processor, cause the hardware processor to:
determine, based on signals from a first barcode scanner and a second barcode scanner, a first two-dimensional light grid indicating where a first item broke beams of the first barcode scanner while breaking beams of the second barcode scanner when the first barcode scanner and the second barcode scanner scanned the first item, wherein the first barcode scanner and the second barcode scanner are arranged such that the beams of the first barcode scanner and the beams of the second barcode scanner are in different planes;
predict, using a machine learning model and based on the first two-dimensional light grid, a first category for the first item, wherein the first two-dimensional light grid indicates to the machine learning model a size and shape of the first item, and wherein the first category of the first item is one of produce or a boxed item;
receive, from a camera, an image of the first item;
after predicting the first category for the first item, retrieve, from a database, a first set of images of items assigned to the first category;
after retrieving the first set of images assigned to the first category, compare the image from the camera of the first item to the first set of images assigned to the first category;
select, an image from first set of images of items assigned to the first category based on similarities between (i) the image from the first set of images of items assigned to the first category and (ii) the image of the first item, wherein the image from the first set of images assigned to the first category shows an item;
determine an identity of the first item as the item in the image from the first set of images;
determine, based on a motion of a hand, that a second item is being taken by the hand; and
generate a message indicating that the second item is being taken.

8. The medium of claim 7, wherein the instructions, when executed, further cause the hardware processor to:
determine, based on signals from the first barcode scanner and the second barcode scanner, a second two-dimensional light grid indicating where a third item broke the beams of the first barcode scanner and the second barcode scanner when the first barcode scanner and the second barcode scanner scanned the third item; and
predict, using the machine learning model and based on the second two-dimensional light grid, that the third item is a hand.

* * * * *